United States Patent

Bloch

[15] 3,646,658
[45] Mar. 7, 1972

[54] WINDING FIXTURE
[72] Inventor: James E. Bloch, Montevideo, Minn.
[73] Assignee: Control Data Corporation, Minneapolis, Minn.
[22] Filed: Sept. 2, 1970
[21] Appl. No.: 69,084

[52] U.S. Cl. .................................................29/205 R
[51] Int. Cl. ...................................................H02k 15/06
[58] Field of Search...........29/205 R, 205 D, 203 P, 203 MW

[56] References Cited

UNITED STATES PATENTS 2,443,824  6/1948  Johnson...............................29/205 R Primary Examiner—Thomas H. Eager
Attorney—Paul L. Sjoquist and Joseph A. Genovese

[57] ABSTRACT

Apparatus for assisting an operator in the assembly of stators, primarily for synchronous motors. The apparatus is a fixture which holds the stator and a curved mask in a series of positions which direct the operator's attention to the proper slots of the stator in which prewound coils should be placed. The correct sequence of insertion is indicated by instructions which appear in a window on the fixture. These instructions show the operator both the current step of the assembly process and the step to be next completed.

20 Claims, 2 Drawing Figures

WINDING FIXTURE

SUMMARY OF THE INVENTION

This invention relates to apparatus for assembling the stator of a synchronous electric motor, and more particularly, to an apparatus for assisting the operator insert coils into the slots of a stator of a synchronous electric motor.

The assembling of coils on the stator of a synchronous electric motor has long been a tedious and often unreliable process. Usually assembly is done totally by handwork, through a number of complex assembling machines have been designed. Both approaches have been subject to substantial limitations.

A brief explanation of the operation will render apparent the reasons that the above approaches have not been fully successful.

The stator consists of a laminated metal cylinder with a generally circular central opening. The opening is relatively large with respect to the cylinder, but is small for the amount of work which must be done within it. The internal circumference of the metal cylinder contains many, on the order of 15, horseshoe shaped slots on the periphery of the circle. It is these slots which accept the windings. A loop or coil of wire is inserted into the appropriate slots. This is done by simply forming the loop into an elliptical shape and placing it with its major axis parallel to the slots and within the internal diameter of the stator. Each of the longer arcs of the loop are then placed in a preselected slot. The shorter arcs of the loop, on either end of the stator, are bent over to keep the coil in place and the loop may be further secured, if necessary. The coils are inserted until each slot contains sections of two loops and an overlapping pattern is achieved.

The difficulties with this apparently straightforward process are many and varied. The working area is small to begin with and there are normally many wires, which cramp assembly.

Quality control is particularly important. The synchronous motor is primarily designed to transfer precise angular position information. Angular position data is mechanically fed to the synchro by rotation of the synchro transmitter's rotor. Change of the rotor position has an inductive effect on the stator windings. This results in the generation of an electrical signal which is carried to one or more synchro receivers. They, in turn, translate the electrical signal into a position change on a dial or other mechanical device. There is a need for great accuracy in the transmission of such information. They are frequently used in military fire control and radar systems, for example. Each coil must be in exactly the slots designated for there to be the inductive effect and resultant angular position control which is necessary.

The most common assembly method is total handwork. This is done because of the need for constant quality checks as well as the difficulty of designing reliable machinery to work in such restricted spaces. Though the process sounds uncomplicated, it is often confusing during assembly to decide which pair of slots should receive the next coil. As the stator has more and more wires covering its internal circumference, each begins to look much like the other. Repetitious references to blueprints and other directions become necessary or a high scrap rate will result. This, obviously, results in an extremely slow process. Even frequent references to blueprints do not wholly solve the scrap rate problem. The distraction of an assembler taking his eyes from the workpiece disturbs the assembly pattern and tends to introduce an element of error. Moreover, an assembler needs to fully review the status of the assembly process each time production is interrupted.

Many attempts have been made to streamline and mechanize the assembly process. However, much of the effort has been restricted to mechanisms for coiling the wire efficiently. While this is not to be minimized, the major area of difficulty is not winding the coils, but properly inserting them once they are wound. Those mechanisms which have dealt with the problem of actual inserting and securing of the coil have, as a general rule, been rather expensive and involved complex machinery. Moreover, they generally attempt to solve the problem of slow and inaccurate insertion of the coils into a pair of slots, only after the slots have been selected. They do not solve the problem of requiring an operator to make frequent references to a blueprint or directive, or alternatively, to exercise a feat of memory. Thus, prior art devices have increased substantially the amount of investment necessary in assembly hardware, but have not significantly reduced the largest cause of potential error and delay.

Thus, it is an object of the present invention to provide for a substantially easier method of assembly of a stator.

Another object of this invention, is to speed the assembly process by minimizing the necessity for frequent reference to directive aids.

A further object of this invention, is to provide for assembly of a stator with less chance of faulty products being produced, by minimizing the chances for operator mental error.

A still further object of this invention, is to provide for partially mechanizing the assembly process without the necessity for a large investment in tools and fixtures.

A still further object of the invention is to provide an aid to assembly which is easily convertible from one size or model stator to another.

A still further object of this invention is to provide an aid to assembly which allows an operator to resume assembly after an interruption, without further delay.

A still further object of the invention is to provide a portable mechanism for assisting stator assembly.

Other objects and advantages of this invention will become apparent upon examination of the following disclosure and the accompanying drawings.

DETAILED DESCRIPTION OF THE DRAWINGS

Figure 1:
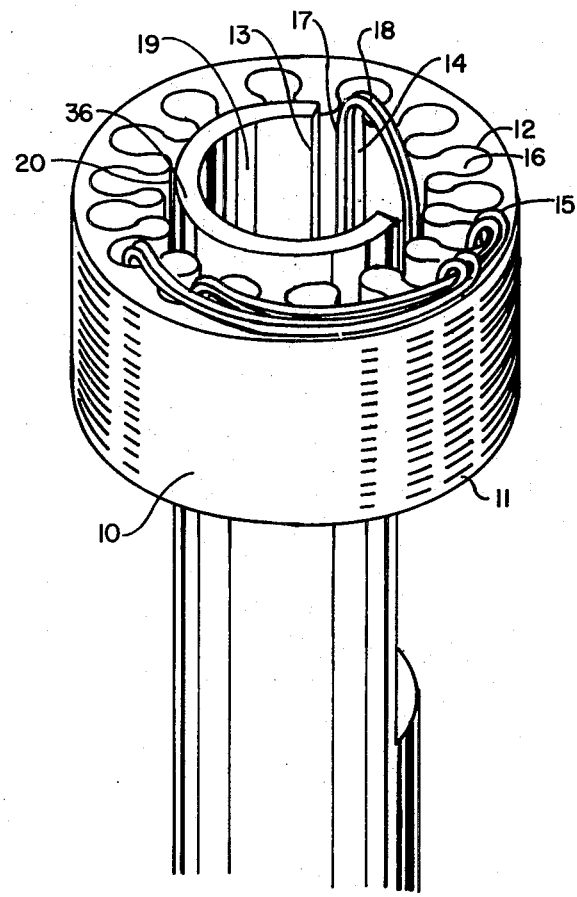
FIG. 1 is a perspective view of a partially assembled stator.

FIG. 1 illustrates a motor stator 10 which is shown with arcuate mask 36 in place, but without the means for mounting the stator. The stator 10 is constructed of laminated disklike sections 11 for integration into a synchronous electrical motor, not shown. The stator 10 is in the shape of a cylinder with a relatively large circular opening 19. Around the internal circumference 20 of the stator are several generally horseshoe-shaped openings 12. These consist of coil receptacles 16 and narrow openings 14. The narrow openings 14 face radially inward and open into circular opening 19. The narrow openings 14 appear as slots at the interface with circular opening 19.

During assembly, prewound coils 15 are inserted into slots 14. Coils 15 are looped electrical wire shaped generally as an ellipse with long arcs 17 and short arcs 18. Long arcs 17 are aligned generally parallel and adjacent to preselected slots 14. The two long arcs 17 of the coil are inserted through slots 14 into coil receptacles 16, and secured if necessary. Mask 36 serves to direct the operators attention to the proper set of slots 14 into which the coil should be inserted. The mask is constructed of a section of a cylindrical shell, with the edges 13 parallel to slots 14. The curvature of the mask is such that it shields certain slots so that no mistake may be made with respect to them. The mask external circumference is directly adjacent to the internal surface of the stator and concentric within it. The operator need only identify the slots nearest to either edge 13 of mask 36 and insert the coil therein. Short arcs 18 on either end of stator 10 are then bent over so they lie generally flat on the surface of the laminated disks 11 at either end of the stator. The process is repeated until each coil receptacle 16 holds a long arc portion of 2 coils, in overlapping fashion.

Figure 2:
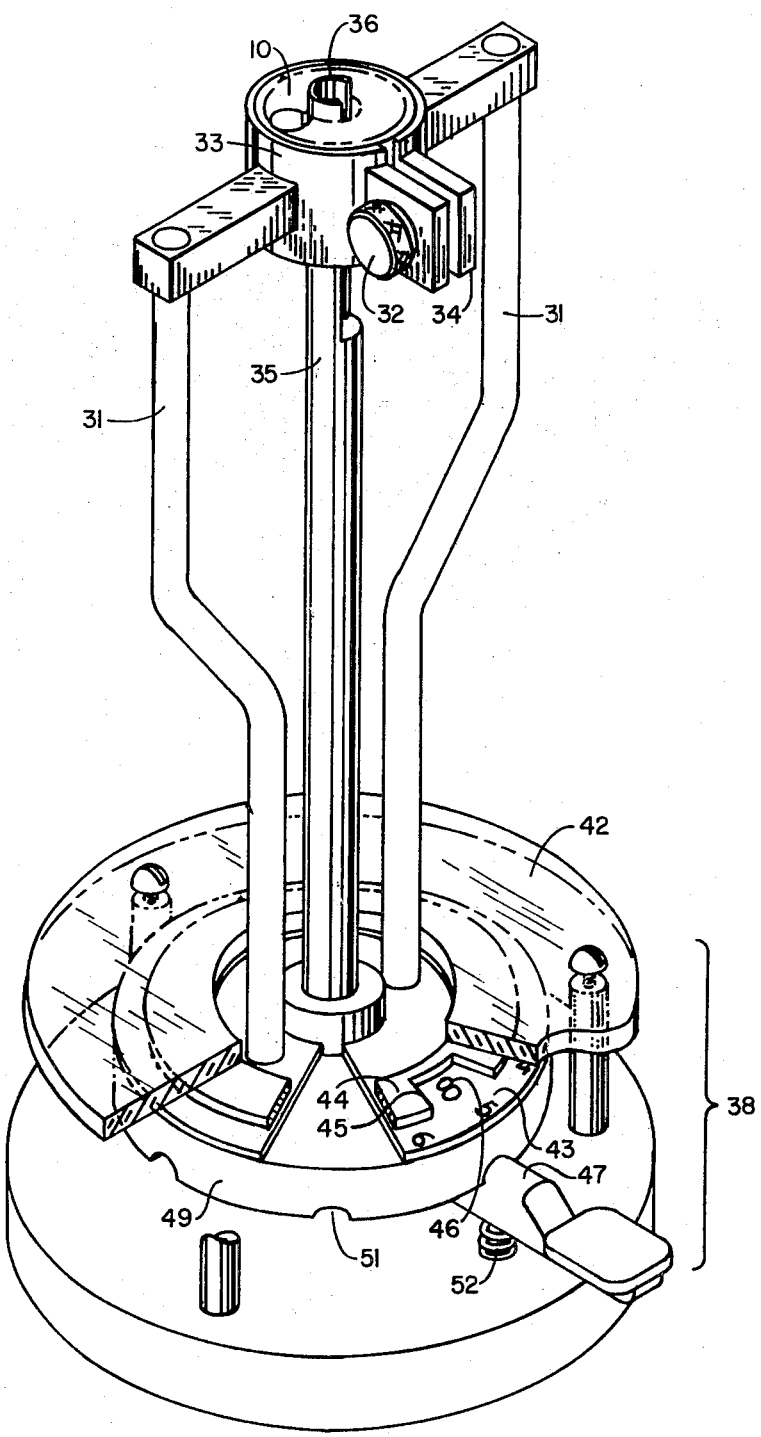
FIG. 2 is a perspective view of the winding fixture, with a stator in position for assembly.

FIG. 2 is a perspective view of the apparatus with a stator in assembly position. For clarity, no wires are included in this view. The stator 10 is held in position for assembly by a device for rigidly mounting the stator. The simple gripping mechanism shown is made up of friction collar 33 which is activated by the force applied to flanges 34 through knob 32. Stanchions 31 connect the stator 10 and friction collar 33 to the base 38. The upright stanchions shown herein are illustrative of one of many ways the stator could be interconnected with the fixture.

The base 38 is constructed of two main components. These are the rotational member, or turntable, 49 and the stationary member or support means 40, which is the stationary portion of the base. The stator 10 will rotate with rotational member 49. Curved mask 36, which is connected to stationary base 40 through upright member 35, will remain in one position. Thus, several angular positions between mask and stator may be easily obtained. Bearing 53 permits ease of rotation between stationary and rotating parts of the base, and establishes an axis of rotation.

Stationary member 40 is connected to transparent shield 42 by uprights 41. The shield 42 allows the operator to view position indicators in the form of alphanumeric characters such as position numbers 43, here represented by the large numeral 5 located on the periphery of turntable 49. The position numbers are indicative of the present relative position of stator and mask, or in other words, the slot combination presently prepared for coil insertion. Radially inward from position numbers 43 are directive numbers 46. The directive numbers, here represented by the numeral 8, are indicative of the next position to which the turntable 49 should be rotated. The position indicators, or indexing references, act as a visual guide for the operator to follow. Both positional and directive numbers are located circumferentially, or on the outer edge, of rotational member 49, and are angularly aligned with both stator and mask.

A portion of rotational member 49 is blocked off by annular opaque shield 44, which is stationary. Opaque shield 44 acts as a means for screening from the operator's view any position indicators except those specifically intended to be seen. A means for exposing only those position indicators, such as window 45, is a part of annular shield 44. The wedge-shaped window 45 permits the viewing of only one position number and one directive number. The operator, thus, at all times knows precisely at what stage of assembly he is and to which he must progress. This is done without reference to other documents and constitutes a mechanical program which instructs the operator as to each step he must make. The opportunity for error is minimal because there are virtually no decisions to be made by the operator.

The control mechanism for the fixture interacts with position numbers 43 and directive numbers 46. To prepare to move from the present position to the next position, the operator need only depress indexing lever 47 so that it disengages from mechanical detent 51. Detent 51 is angularly aligned with the position numbers 43 so that the indexing lever appears directly below the position number when in operating position. It will tend to stay in that position because spring 52 is under compression so as to exert a constant bias toward engagement of indexing lever 47 with detent 51 of turntable 49. When the indexing lever is disengaged, turntable 49 is free to rotate to its next position. This accomplished by the operator rotating the turntable to its next position by fingertip pressure. When the alphanumeric character previously in the spot for the directive numbers appears in the spot for the position numbers, the indexing lever is released and the rotational member 49 locks in position for coil assembly. This process is repeated until assembly is completed.

The structure described relates to one embodiment of the invention. That embodiment has a mask connected to the base structure so as to rotate about the arcuate mask. In another embodiment (not shown) the connections are reversed such that the mask is connected to the rotational member. The mask will rotate within a stator fixed to the stationary member. All elements and features of the invention are identical in both embodiments, they differ only in the mode of assembly.

It should now be apparent, that an apparatus for the accurate and efficient wiring of a stator has been disclosed.

It will be obvious to those skilled in the art that many changes may be made in the embodiment illustrated herein, without departing from the scope of the invention as defined by the appended claims.

What is claimed is:

1. Apparatus for aiding an operator in the insertion of prewound coils into the slots of a stator, comprising:
   a. a support means having a rotatable axis;
   b. a rotational member mounted on said rotatable axis to permit relative rotation between said support means and said rotational member;
   c. a mask mounted on said support means concentrically within the stator;
   d. means for mounting the stator on said rotational member, for rotation therewith, about said mask; and
   e. means for controlling the relative rotational position of said mask and the stator.

2. The apparatus of claim 1, in which said mask comprises an arcuate cylindrical section which has its external circumference adjacent to the internal circumference of the stator, for selective shielding of the slots.

3. The apparatus of claim 1, in which:
   a. the rotational member further comprises position indicators in locations corresponding to positions for coil insertion; and
   b. the support means further comprises screening means for exposing only the position indicators representative of the present and next positions, respectively, of the stator for coil insertion.

4. The apparatus of claim 3, in which the screening means further comprises an opaque annular shield covering all position indicators except those representative of the present and next positions of the stator for coil insertion.

5. The apparatus of claim 3, in which:
   a. the rotational member further comprises mechanical detents angularly aligned with said position indicators; and
   b. the support means further comprises an index lever mounted for selective engagement with said detents to prevent rotation when the stator is in position for coil insertion.

6. The apparatus of claim 5, further comprising means for biasing said index lever toward engagement with said detents.

7. Apparatus for aiding an operator in the insertion of wire into the slots of a stator, comprising:
   a. a base having a stationary member and a rotational member axially mounted with respect to said stationary member, to permit rotation of the rotational member about said axis.
   b. means for mounting the stator in fixed axial relationship with said rotational member;
   c. a mask mounted in fixed relationship with said stationary member and aligned in a concentric position within said stator; and
   d. positioning means coupled between said stationary member and said rotational member for controlling relative rotation therebetween.

8. The apparatus of claim 7 further comprising a visual guide mounted on said rotational member for indicating the relative angular position of the rotational member with respect to the stationary member.

9. The apparatus of claim 8 wherein the positioning means further comprises detents for positioning said rotational member on predetermined relative positions with respect to said stationary member.

10. The apparatus of claim 9 wherein said visual guide includes indexing references for instructing the relative order in which said detents should be engaged.

11. Apparatus for aiding an operator in the insertion of prewound coils into the slots of a stator, comprising:
   a. a support means having a rotatable axis;

b. a rotational member, mounted on said rotatable axis to permit relative rotation between the support means and the rotational member;
c. means for mounting the stator on the support means;
d. a mask, mounted on the rotational member, for rotation therewith, concentrically within the stator; and
e. means for controlling the relative rotational position of said mask and the stator.

12. The apparatus of claim 11, in which said mask comprises an arcuate section of a cylindrical shell, which has its external circumference adjacent to the internal circumference of the stator.

13. The apparatus of claim 11, in which:
a. the rotational member further comprises position indicators in locations corresponding to positions for coil insertion; and
b. the support means further comprises screening means which define the position indicators representative of the present and next positions, respectively, of the stator for coil insertion.

14. The apparatus of claim 13, in which the screening means comprises an opaque annular shield covering all position indicators except those representative of the present and next positions of the stator for coil insertion.

15. The apparatus of claim 13, in which:
a. the rotational member further comprises mechanical detents angularly aligned with said position indicators; and
b. the support means further comprises an index lever mounted for selective engagement with said detents to prevent rotation when the stator is in position for coil insertion.

16. The apparatus of claim 15, further comprising means for biasing said index lever toward engagement with said detents.

17. Apparatus for aiding an operator in the insertion of wire into the slots of a stator, comprising:
a. a base having a stationary member and a rotational member axially mounted with respect to said stationary member, to permit rotation of the rotational member about said axis;
b. means for mounting the stator in fixed axial relationship with said stationary member;
c. a mask mounted in fixed relationship with said rotational member and aligned in a concentric position within said stator;
d. positioning means coupled between said stationary member and said rotational member for controlling relative rotation therebetween.

18. The apparatus of claim 17 further comprising a visual guide mounted on said rotational member for indicating the relative angular position of the rotational member with respect to the stationary member.

19. The apparatus of claim 18 wherein the positioning means further comprises detents for positioning said rotational member on predetermined relative positions with respect to said stationary member.

20. The apparatus of claim 19 wherein said visual guide includes indexing references for instructing the relative order in which said detents should be engaged.

* * * * *